S. NOWLAN.

Galvanic Shoe-Sole.

No. 1,286. Reissued March 11, 1863.

Witnesses
C L Hughes
Jas Delany

Inventor
Sam Nowlan
by A Pollak his atty

UNITED STATES PATENT OFFICE.

CHARLES METTAM, OF NEW YORK, N. Y., ASSIGNEE OF SAMUEL NOWLAN.

IMPROVEMENT IN GALVANIC SOLES.

Specification forming part of Letters Patent No. 32,603, dated June 18, 1861; Reissue No. 1,286, dated March 11, 1862.

*To all whom it may concern:*

Be it known that SAMUEL NOWLAN, of New York, in the county of New York and State of New York, has invented a new and improved construction of articulated electro-voltaic plate-work for medical and other purposes, and applicable as an interior fitting or lining to or of boots, shoes, and slippers, or to be worn around the waist or around the legs and arms in the form of garters, bracelets, and otherwise; and I do hereby declare that the following, taken in connection with the accompanying drawings, that form part of this specification, is such a full and clear description thereof as to enable others skilled in contrivances to which this improvement relates to make and use the same.

Figure 1:
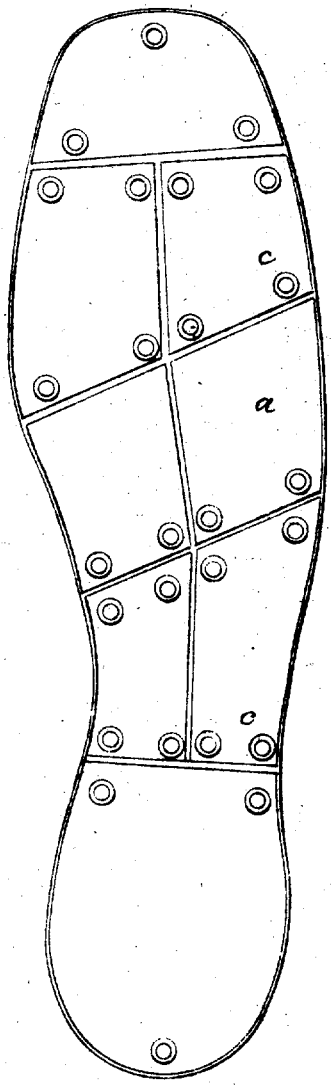
Figure 2:
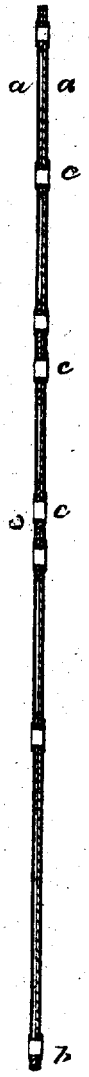
Figure 3:
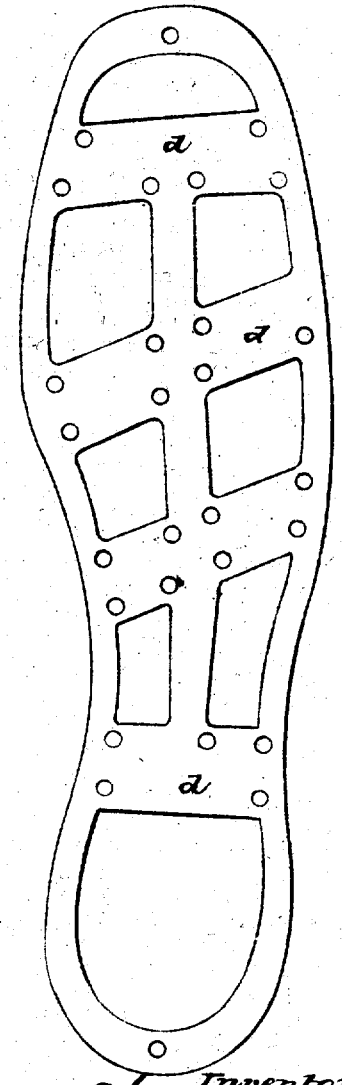

In illustration of this invention the accompanying drawings represent views of a galvanic sole constructed in accordance with the improvements hereinafter described, Figure 1 representing a plan view, and Fig. 2 a longitudinal section thereof, and Fig. 3 a plan view of the skeleton-insulator belonging to the same detached.

One of the many applications of galvanic or voltaic electricity has been the formation of different articles of wear about the person in the shape of rings, chains, boot and shoe soles, &c., composed of copper and zinc, or their chemical equivalents or substitutes, and which, as positives and negatives in close contact or juxtaposition, develop a large or continuous amount of electricity of feeble intensity, that, acting upon the nerves of the wearer, is found beneficial for various complaints or infirmities. That copper and zinc, or their equivalents, will, when brought in contact, establish voltaic electricity, without the aid, as in the galvanic battery, of an acidulous exciting medium, is a fact beyond a doubt, and the only problem requiring solution, so far as the practicability of such to medical purposes is concerned, is, what the best or cheapest and most efficient mode of developing or applying the same. Among the best applications of the kind have been loose or inner soles for boots and shoes, as before referred to, because these, acting on or against the feet, transmit the electricity developed by them upwardly through the body, and because the heat evolved by the contact of the positive and negative plates of said soles serves in a gentle manner to keep the feet warm, while the acid contained in the perspiration which exudes from the feet quickens or excites the electrical capacity of the plates; also, because positives and negatives in the form of plates are preferable to many or most others, and for other reasons. To form an efficient voltaic pile, however, it is desirable to employ a multiplicity of plates or plate-sections separate at their edges from each other, in preference to a single plate or plates of equal area and thickness. The galvanic soles heretofore used or proposed have been defective in this respect, as well as in the binding rigidity of the same to the foot. They have, it is true, been made in two or three sections hinged together at or in front of the tread to give certain pliability; but such is a very insignificant provision, or no provision at all, as regards general pliability or multiplication and division of the plate-surfaces. This and other radical defects are obviated by this improvement, which largely enhances the value, in a working or medical capacity and in other respects, of such contrivances, as the following description will serve to explain.

Referring to the drawings, the sole is or may be made up of two negative tiers, in preference to one, with the positive in between them, or this order may be reversed. The negative or upper and lower tier of the pile is or may be formed of copper plates or sections *a a a a* and the positive of zinc plates or sections *b b b b*, so divided and kept separate, preferably longitudinally as well as transversely of or to the sole, as to establish a multiplicity of negatives and positives, with their contiguous edges exposed and breaking contact, whereby a more efficient sole-battery is produced, and so as to establish an articulated character to the sole of general pliability.

The several sections of the copper and zinc plates are or may be connected or hinged together by a flexible insulating strip or strips of, say, india-rubber or any other suitable material united to the sectional plates by metallic eyelets *c*. This makes a cheap, expeditious, and efficient mode of holding together the articulated plate-work of the sole formed of sections, as described; and in order to give a more united character to the whole, as well as to facilitate manufacture, I prefer to connect several or all of the sections in the manner described by a single insulating-strip or interposed medium, *d*, made with perforations in it, or of skeleton form or build, so as to admit of the copper and zinc plates, or, rather, those sections of them which lie the one under the other, coming in contact to establish electrical action between or by said plates or plate-sections.

From the above description of the improvement in the construction of articulated galvano-electric soles it will be understood that it is applicable to all kinds of galvano-electric plate-work of an articulated character. Thus bracelets, breast-plates, belts, &c., may be constructed so as to embody the principles of this invention, and I shall now state my claims to the invention of the said NOWLAN, as follows:

I claim—

1. The formation of articulated electro-voltaic plate-work in sections, as described, throughout the whole or major portion of its area, so as to give to the same a general pliability, and formed of copper and zinc plates, or their equivalents, essentially as described, and the several sections of negative and positive plates being united in separate relations to their contiguous sections by a flexible insulating strip or strips, substantially as specified.

2. Uniting the several sections of articulated electro-voltaic plate-work by means of eyelets or their equivalents, substantially as herein set forth.

3. The employment of a skeleton flexible insulator for uniting the several sections of articulated galvano-electric plate-work.

CHAS. METTAM.

Witnesses:

A. POLLOK,

B. W. METTAM.